P. T. STRADER.
VALVE CONTROLLING MECHANISM FOR TRAIN AIR BRAKE SYSTEMS.
APPLICATION FILED SEPT. 20, 19.1.
1,029,477.
Patented June 11, 1912.
Fig. 1
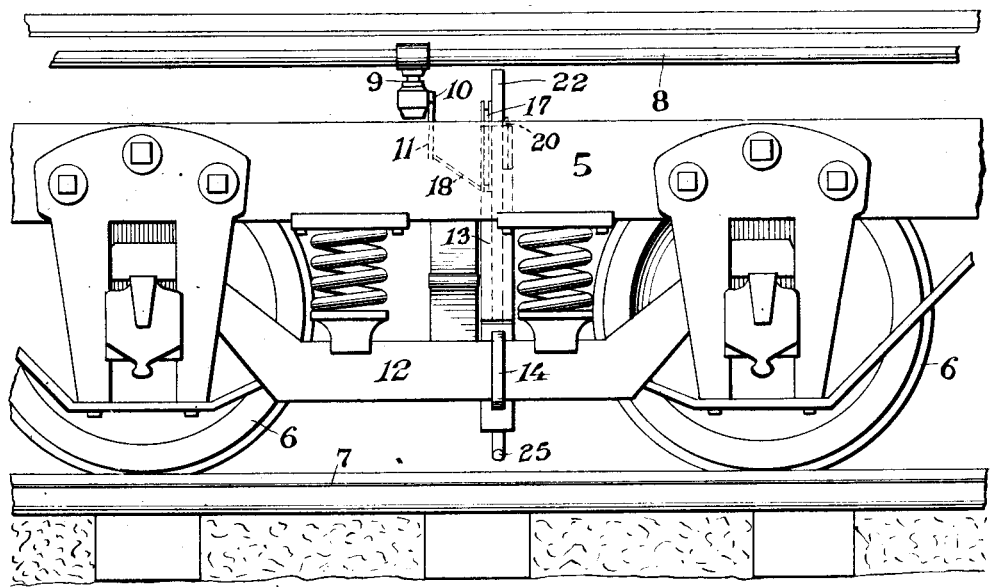
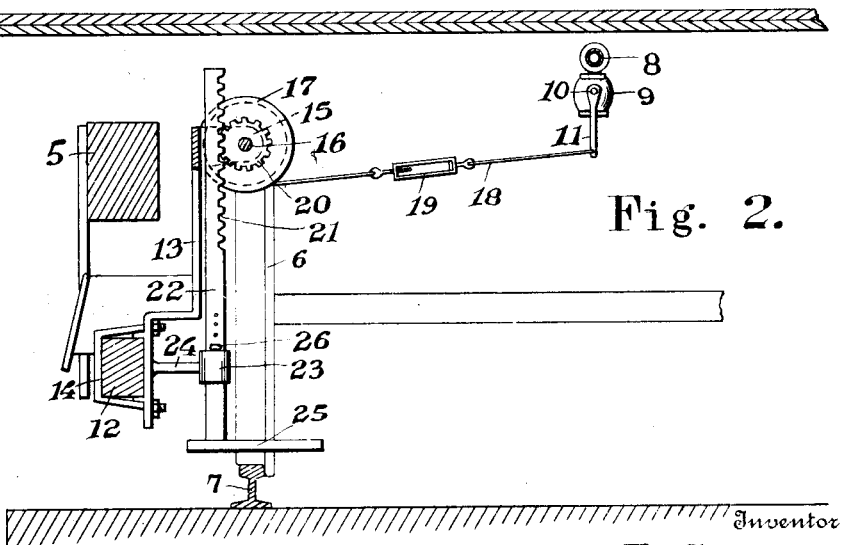
Fig. 2.
Inventor
Perry T. Strader
Witnesses
By Victor J. Evans
Attorney

UNITED STATES PATENT OFFICE.

PERRY T. STRADER, OF AMARILLO, TEXAS.

VALVE-CONTROLLING MECHANISM FOR TRAIN-AIR-BRAKE SYSTEMS.

1,029,477. Specification of Letters Patent. Patented June 11, 1912.

Application filed September 20, 1911. Serial No. 650,316.

*To all whom it may concern:*

Be it known that I, PERRY T. STRADER, a citizen of the United States, residing at Amarillo, in the county of Potter and State of Texas, have invented new and useful Improvements in Valve-Controlling Mechanism for Train-Air-Brake Systems, of which the following is a specification.

The invention relates to valve operating mechanism, and more particularly to the class of valve operating mechanism for air brake systems on railway trains.

The primary object of the invention is the provision of a valve operating mechanism in which the stop cock of an air brake system upon a railway train may be opened for the application of the brakes on the derailment of the car, so as to avoid wrecks, or the loss of life, resultant from the car or cars leaving the rails of a track.

Another object of the invention is the provision of a device of this character which is simple in construction, readily and easily applied to a car, locomotive, or the like, and that will be thoroughly reliable and efficient in operation, and inexpensive in installation.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a fragmentary side elevation of a car truck, train pipe, and stop cock, with the operating mechanism connected thereto and constructed in accordance with the invention. Fig. 2 is a vertical transverse sectional view thereof.

Similar reference characters indicate corresponding parts throughout the several views of the drawings.

In the drawings, there is shown a portion of a car truck 5 of the ordinary well-known construction, in which are journaled the car wheels 6 adapted to travel upon the rails 7 of a track, as usual. Above the truck 5 and below the body of the car is disposed the usual air pipe 8 of the air brake system (not shown), the said pipe 8 being provided with a stop cock 9 for the exhaust of air therefrom, the said stop cock being provided with a turning valve plug 10, as usual, having a crank 11, to which is adapted to be connected the valve controlling mechanism, presently described.

Connected with the arch beam 12 of the car truck, adjacent to the stop cock 10, is a vertical standard 13, the lower end of which is inset and has engaged therein a clip 14 embracing the arch bar or beam 12 for securely fastening the standard 13 to the truck. The upper end of the standard 13 is formed with inturned spaced bearings 15, in which is journaled a rotatable spindle 16, the same supporting a pulley 17, to which is fixed one end of a pull cable or band 18, the opposite end of which is fixed to the crank 11 of the valve plug 10 in the said cock 9, the said cable or band 18 being provided, intermediate its length, with a turning buckle 19, whereby the band or cable 18 may be lengthened, or shortened, as desired.

The pulley 17 is fixed to the spindle 16 and has formed at one side thereof a rack pinion 20, meshing with the teeth 21 of a vertical rack bar 22, the same being slidably mounted in a guide sleeve 23 formed on the end of a bracket arm 24 fixed to the inset lower end of the standard 13, the lower end of the rack bar 22 being formed with a foot 25 which is adapted to contact with the tread of the rail 7, adjacent thereto, when the car wheels 6 jump the track, or in other words, on the derailment of the car. Thus, the rack bar 22 will be caused to move upwardly, thereby winding the cable or band 18 upon the pulley 17, and in this manner pulling upon the crank 11 of the valve plug 10 for the opening of the stop cock 9 and exhausting the air in the pipe 8 for the application of the brakes, as usual.

Adjustably engaged in the rack bar 22 is a cock pin or key 26, which latter rests upon the guide sleeve 23, so as to normally hold the rack bar raised the required distance, whereby the foot 25 thereon will be slightly elevated from the tread of the rail 7 adjacent thereto, when the car wheels are traveling upon the rails of the track, so that the stop cock will be sustained closed, the brakes of the cars being operated in the usual well-known manner.

When the wheels of the car truck are traveling upon the rails of the track, the foot 25 is disposed directly above the rail 7, adjacent thereto, so that on the derailment of the car, the foot 25 will engage with the rail for operating the valve controlling mechanism, whereby the brakes of the car will be instantly applied thereby avoiding a wreck and the loss of life, resultant therefrom.

What is claimed is:

1. The combination with a wheel truck and a valved train pipe, of valve operating mechanism, comprising a vertical bracket, a clip detachably connecting the lower end of the bracket to the truck, a guide sleeve projecting inwardly from said bracket, a rack bar slidable in the sleeve and having a foot adapted for contact with a rail on the derailment of the truck, a cog gear journaled on the bracket and meshing with said rack bar, a pulley operated by the gear, and a pull member connected with the valve and said pulley.

2. The combination with a wheel truck and a valved train pipe, of valve operating mechanism, comprising a vertical bracket, a clip detachably connecting the lower end of the bracket to the truck, a guide sleeve projecting inwardly from said bracket, a rack bar slidable in the sleeve and having a foot adapted for contact with a rail on the derailment of the truck, a cog gear journaled on the bracket and meshing with said rack bar, a pulley operated by the gear, a pull member connected with the valve and said pulley, and adjustable stop means carried by the rack bar for limiting the downward movement thereof in the sleeve.

In testimony whereof I affix my signature in presence of two witnesses.

PERRY T. STRADER.

Witnesses:
F. W. ZIMMERMAN,
B. H. McALPINE.